United States Patent
Isler et al.

(10) Patent No.: US 10,423,886 B2
(45) Date of Patent: Sep. 24, 2019

(54) ELECTRONIC LOGS WITH COMPLIANCE SUPPORT AND PREDICTION

(71) Applicant: Forward Thinking Systems, LLC, Jericho, NY (US)

(72) Inventors: David Isler, Plainview, NY (US); Stuart Lowenstein, West Hempstead, NY (US)

(73) Assignee: Forward Thinking Systems, LLC, Jericho, NY (US)

( * ) Notice: Subject to any disclaimer, the term of this patent is extended or adjusted under 35 U.S.C. 154(b) by 29 days.

(21) Appl. No.: 15/859,205

(22) Filed: Dec. 29, 2017

(65) Prior Publication Data

US 2019/0205781 A1    Jul. 4, 2019

(51) Int. Cl.
*G06N 7/00* (2006.01)
*G07C 5/02* (2006.01)
*G06Q 10/06* (2012.01)
*G06Q 10/04* (2012.01)

(52) U.S. Cl.
CPC .............. *G06N 7/005* (2013.01); *G07C 5/02* (2013.01); *G06Q 10/047* (2013.01); *G06Q 10/063114* (2013.01)

(58) Field of Classification Search
CPC .................................................. G06N 5/04
USPC ......................................................... 706/45
See application file for complete search history.

(56) References Cited

U.S. PATENT DOCUMENTS

| | | | |
|---|---|---|---|
| 2006/0095175 A1* | 5/2006 | deWaal | G07C 5/008 701/31.4 |
| 2016/0332574 A1 | 11/2016 | Park et al. | |
| 2017/0017927 A1* | 1/2017 | Domnick | G06Q 10/1091 |
| 2017/0200061 A1 | 7/2017 | Julian et al. | |
| 2017/0263120 A1* | 9/2017 | Durie, Jr. | G08G 1/205 |
| 2017/0286782 A1 | 10/2017 | Pillai et al. | |
| 2017/0289089 A1 | 10/2017 | Liang | |

OTHER PUBLICATIONS

An online article ("Electronic Driver Log Solutions to Better Manage Your Fleet" Apr. 7, 2016).*

* cited by examiner

*Primary Examiner* — Lut Wong
(74) *Attorney, Agent, or Firm* — Carr & Ferrell LLP

(57) ABSTRACT

A method for electronic logging of carrier data is described. The method includes monitoring a vehicle motion status for a predetermined period and assigning a logical state to at least one duty status variable. A plurality of travel conditions capable of changing a transit period, such as weather, traffic, and construction are monitored, aggregated, and used to determine a predicted likelihood of changing the transit period. The likelihood of occurrence of a compliance rule violation is determined, based on the aggregated values, the predicted likelihood of changing the transit period, and a group of compliance rules. An indicator of the likelihood of occurrence of a compliance rule violation may be generated, and presented to any number of electronic devices. Remedial actions to avoid or mitigate the compliance rule violation may be suggested.

21 Claims, 10 Drawing Sheets

|          | Sleeper | Off-duty | On-duty | Driving |
|----------|---------|----------|---------|---------|
|          | 1       | 0        | 0       | 0       |
|          | 0       | 1        | 0       | 0       |
|          | 0       | 0        | 1       | 0       |
|          | 0       | 0        | 0       | 1       |

FIG. 4

ELECTRONIC LOGS WITH COMPLIANCE SUPPORT AND PREDICTION

CROSS-REFERENCE TO RELATED APPLICATIONS

This patent application is related to co-pending U.S. patent application Ser. No. 15/859,196, filed on Dec. 29, 2017 and entitled "FleetCam Integration". The disclosure of the above-referenced application is herein incorporated by reference in its entirety for all purposes.

FIELD

The present application relates generally to carrier duty logs and, more specifically, to electronic duty logs having compliance support and prediction.

BACKGROUND

Records of Duty Status (ROD), often maintained in an electronic logbook referred to herein as Electronic Logging Device (ELD), are widely used to monitor compliance of State and Federal regulations by operators of carrier vehicles. Exemplary regulations include maximum driving time for a vehicle, and limitations to the number of operator on-duty hours. Typically, these records are manually entered by operators of vehicles and regularly checked for compliance by officials; however, manual entry is prone to error generation that may result in citations for violation of regulatory statutes. While computer-aided automated log entry in the form of ELD software is beneficial for reducing recording errors, circumstances that occur during transit may lead to delays that increase the likelihood of obtaining compliance violations. These circumstances include weather and traffic events, construction events, inability to procure lodging, or frequent or lengthy breaks by vehicle operators. A system and method that predicts and avoids potential noncompliance of mandated regulations can improve operator efficiency, and carrier fleet operations.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

A method for electronic logging of carrier data is described. The method includes monitoring a vehicle motion status for a predetermined period and assigning a logical state to at least one duty status variable. Also included is monitoring at least one current vehicle service event capable of changing a transit period, and processing the current vehicle service events to determine a predicted likelihood of changing the transit period. Steps also include aggregating the values for each duty status variable over a specified quantity of the predetermined periods, the specified quantity being determined by a predetermined rule, followed by predicting the likelihood of occurrence of a compliance rule violation based on the aggregated values, the predicted likelihood of changing the transit period, and a group of compliance rules. Additional steps include generating an indicator of the likelihood of occurrence of a compliance rule violation, and presenting the indicator of the likelihood of occurrence of a compliance rule violation to at least one electronic device.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements.

FIG. 4 is a table indicating the possible states of the binary values for the duty status variables, according to an exemplary embodiment.

DETAILED DESCRIPTION

The technology disclosed herein is directed to systems and methods for electronic logs with compliance support and prediction.

The present technology may be used for providing electronic logs on stand-alone electronic devices, or the technology may be provided in a networked configuration, including in a computing cloud network architecture.

Figure 1:
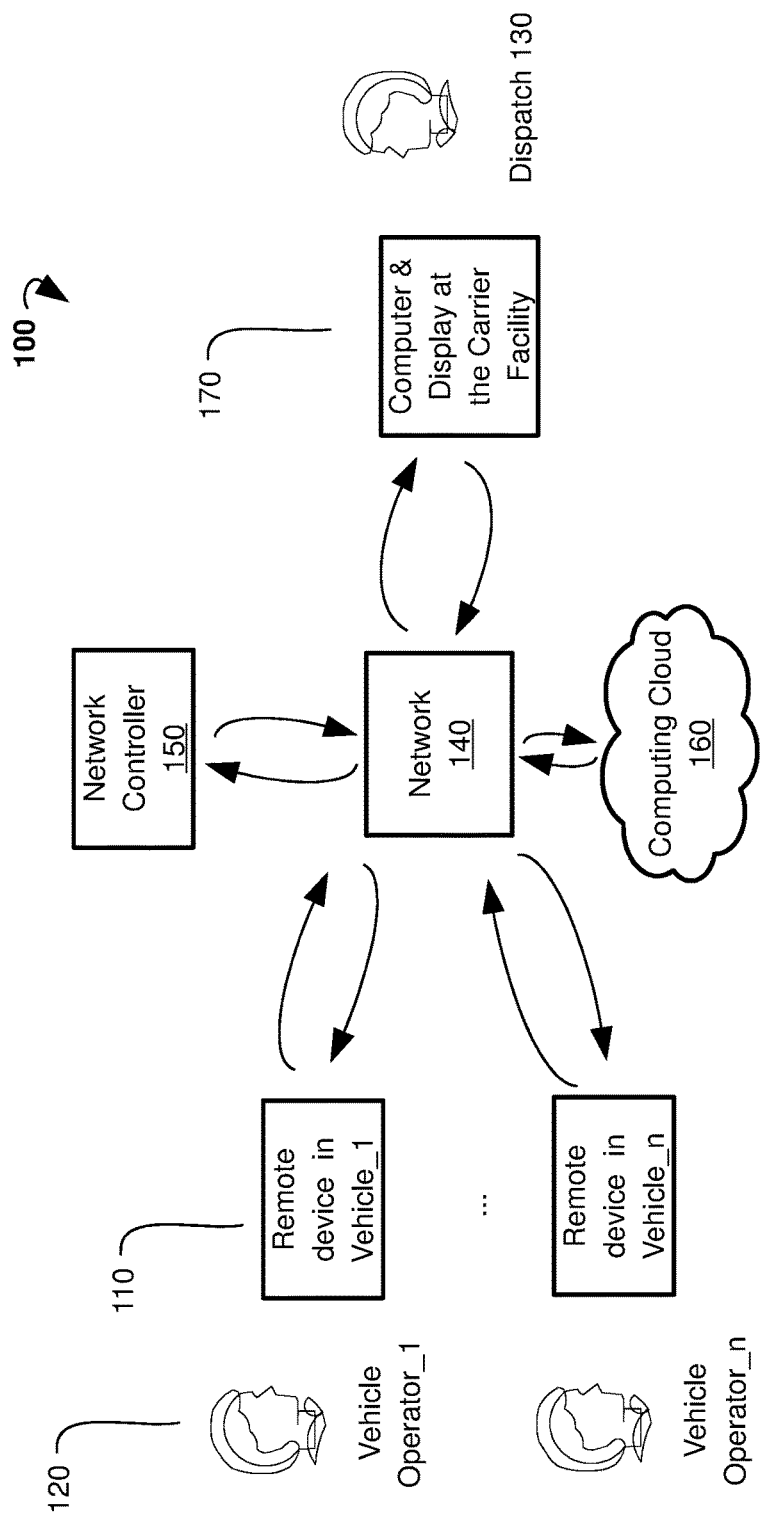
FIG. 1 is a block diagram illustrating a system exemplifying electronic logs with compliance support.

FIG. 1 is an illustration of an exemplary configuration of a networked electronic vehicle tracking and management system 100.

In various embodiments, each vehicle in a fleet of vehicles (1 through 'n') is outfitted with a remote device 110, such as computer and optionally an imaging device such as a video camera. The remote device 110, such as computers and imaging device are each connected to a network 140, such as the internet, where a number of network controllers 150 route data between the remote device 110, such as the vehicle computer and a computer at a dispatch center at the carrier facility 170, for example. Dispatch 130 may communicate with vehicle operators 120 during transit in order to relay commands based on vehicle and operator information received by Dispatch on a computer and display at the carrier facility 170. The networked configuration may also use servers configured on a computing cloud 160 to perform data storage, retrieval, and other functions in response to commands sent by Dispatch 130 to the computing cloud 160. In some embodiments, vehicle and vehicle operator 120 performance may be monitored by Dispatch 130 for compliance with regulations that govern carrier transit. Federal and State agencies may enact and enforce regulations, for example. In some embodiments, regulations may be enacted by the carrier industry, or company-specific regulations may be imposed. Operator regulations include, for example, a limitation on a contiguous driving period, and a limitation on a contiguous on-duty period. Nonconformance with regulations may prompt a costly violation citation.

Figure 2:
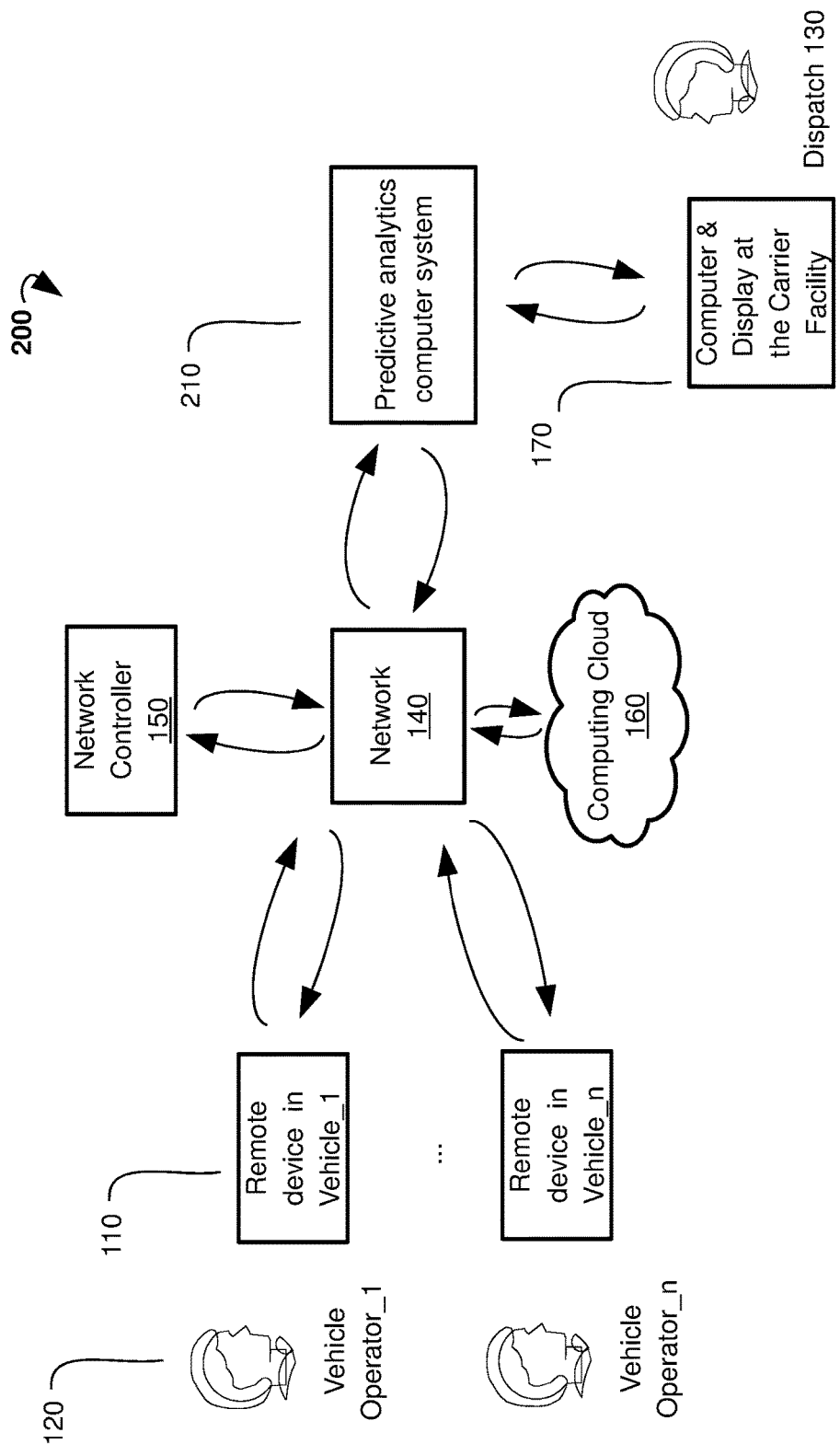
FIG. 2 is a block diagram illustrating a system exemplifying electronic logs with compliance support and prediction.

FIG. 2 is an illustration of an exemplary configuration of a networked electronic vehicle tracking and management system 200, similar to the configuration shown in FIG. 1, with the addition of a predictive analytics computer system 210 for aggregating vehicle service data and having a capability to predict impending noncompliance with regulations. Vehicle service data may include, for example, weather, traffic, and road construction conditions that could impact the expected time of arrival (ETA) at various stops during transit. Other vehicle service data may include driver specific information, such as rest stop requirements, or vehicle specific data such as incidence of breakdown. Under prompting from Dispatch 130, or autonomously, the predictive analytics computer system 210 may determine the risk of regulation noncompliance. In some embodiments, the predictive analytics computer system 210 specifies a remedial action to help prevent or mitigate an anticipated noncompliance event, thereby avoiding or minimizing a violation penalty.

Figure 3A:
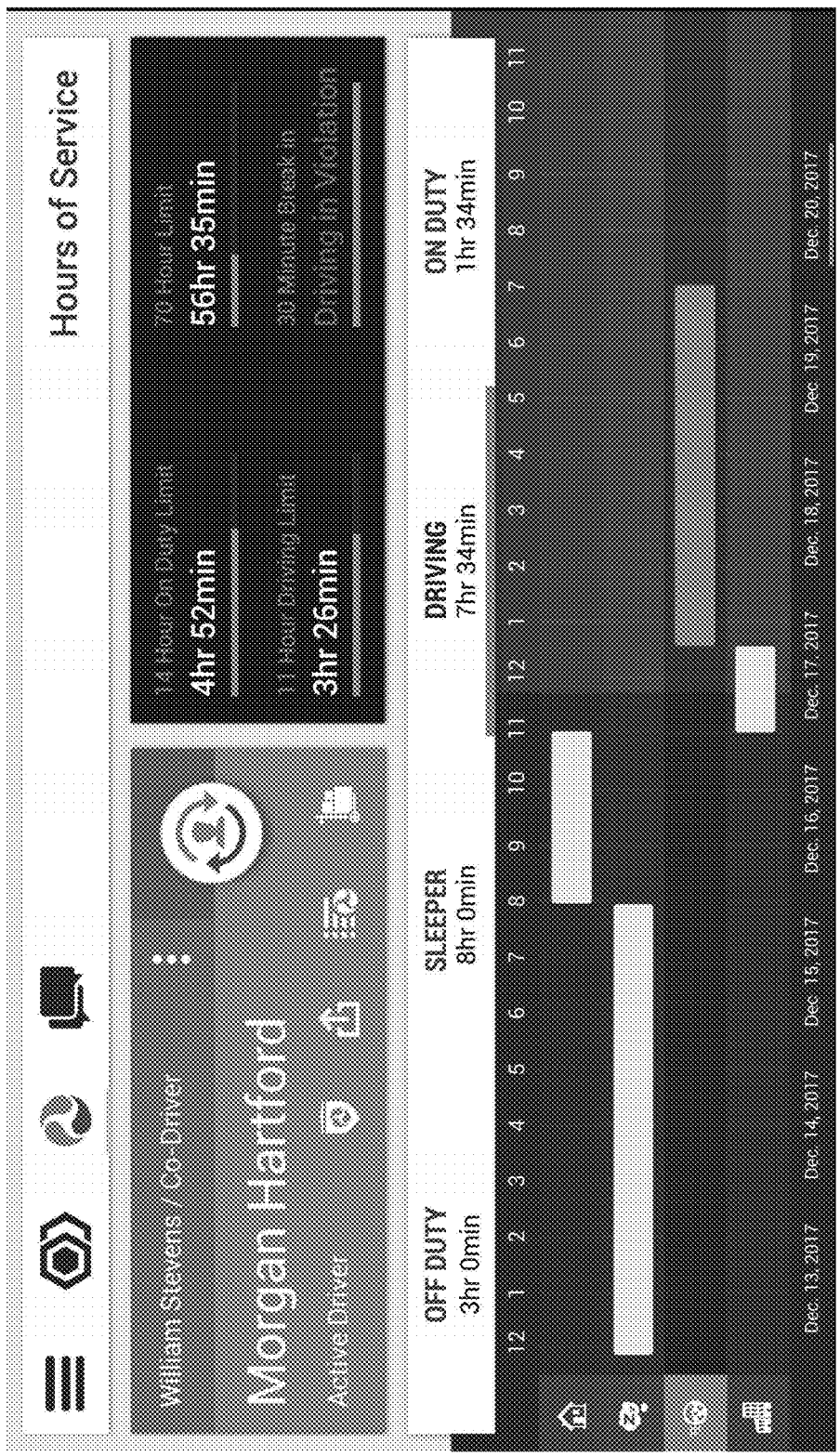
FIG. 3A is an illustration of a user interface for an electronic log with compliance support, according to an exemplary embodiment.

One example regulation concerns the period in which a vehicle operator may legally operate the vehicle. An operator's activity may coincide with one of four exemplary configurations defined by the duty status variables: "Off duty", "Sleeper", "Driving", and "On-Duty". The four duty status variables are binary and mutually exclusive. As would be understood by persons of ordinary skill in the art, while these four statuses are depicted on the figure, there may be fewer or additional driver status configurations displayed. FIG. 3A shows an image of an Electronic Duty Log (ELD) User Interface (UI), which may be represented on a remote device 110, such as a vehicle based computer display, and also on a Dispatcher computer and display at the carrier facility 170. The name of the vehicle operator ("current driver") is shown as well as a secondary operator ("co-driver"). A chart format indicates the operating performance of the driver with respect to each of the duty status variables. The ability of the driver to adhere to various prescribed regulatory limits is measured and tracked. In the example UI shown, the driver is "driving in violation" of a regulation, i.e. he has driven for a period that is longer than is regulated, and is therefore, not driving in compliance, and may be subject to a citation for violation of a regulation.

Figure 3B:
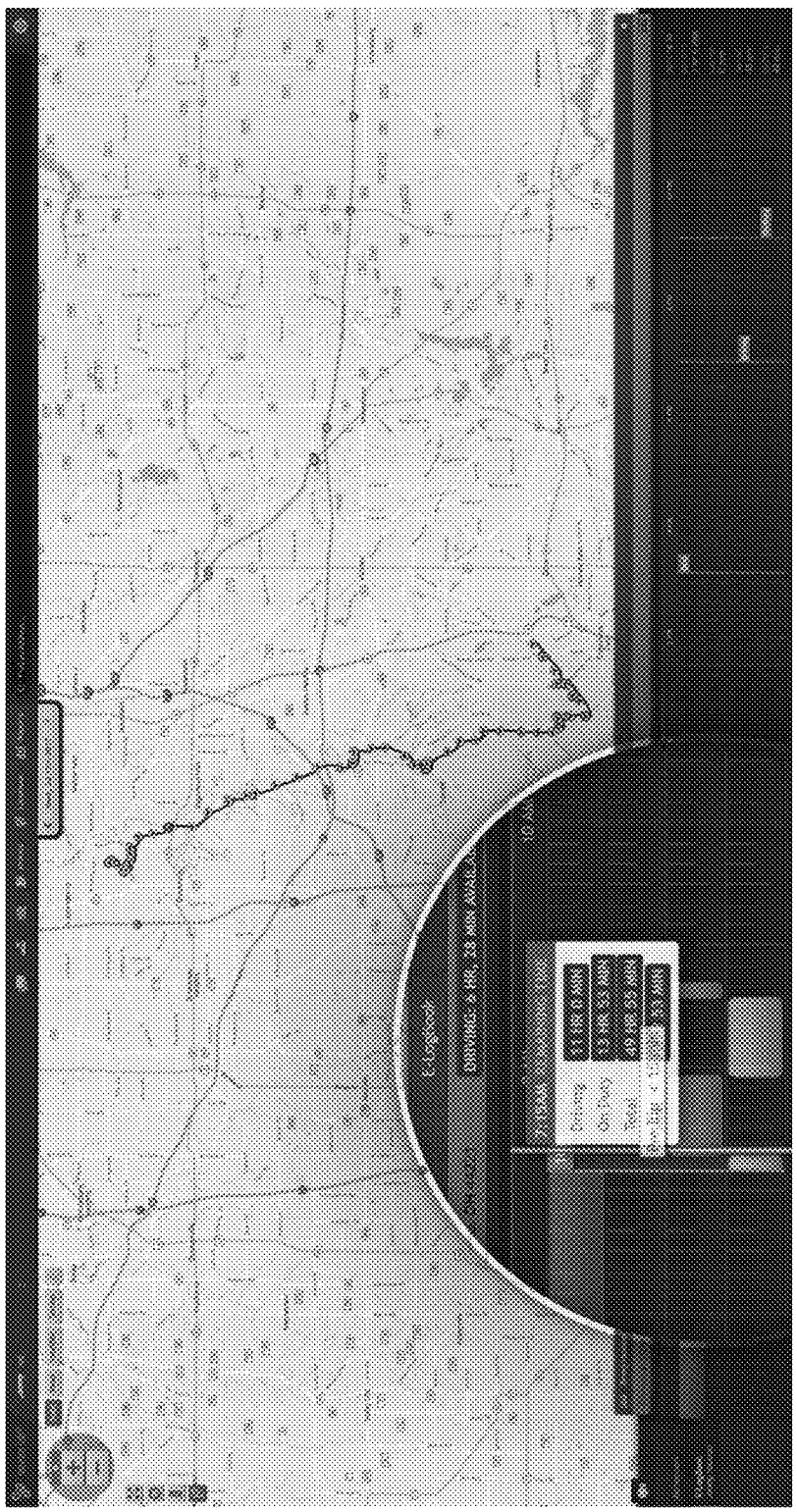
FIGS. 3B, 3C, and 3D are exemplary illustrations of a user interface of an electronic logging device.
Figure 3C:
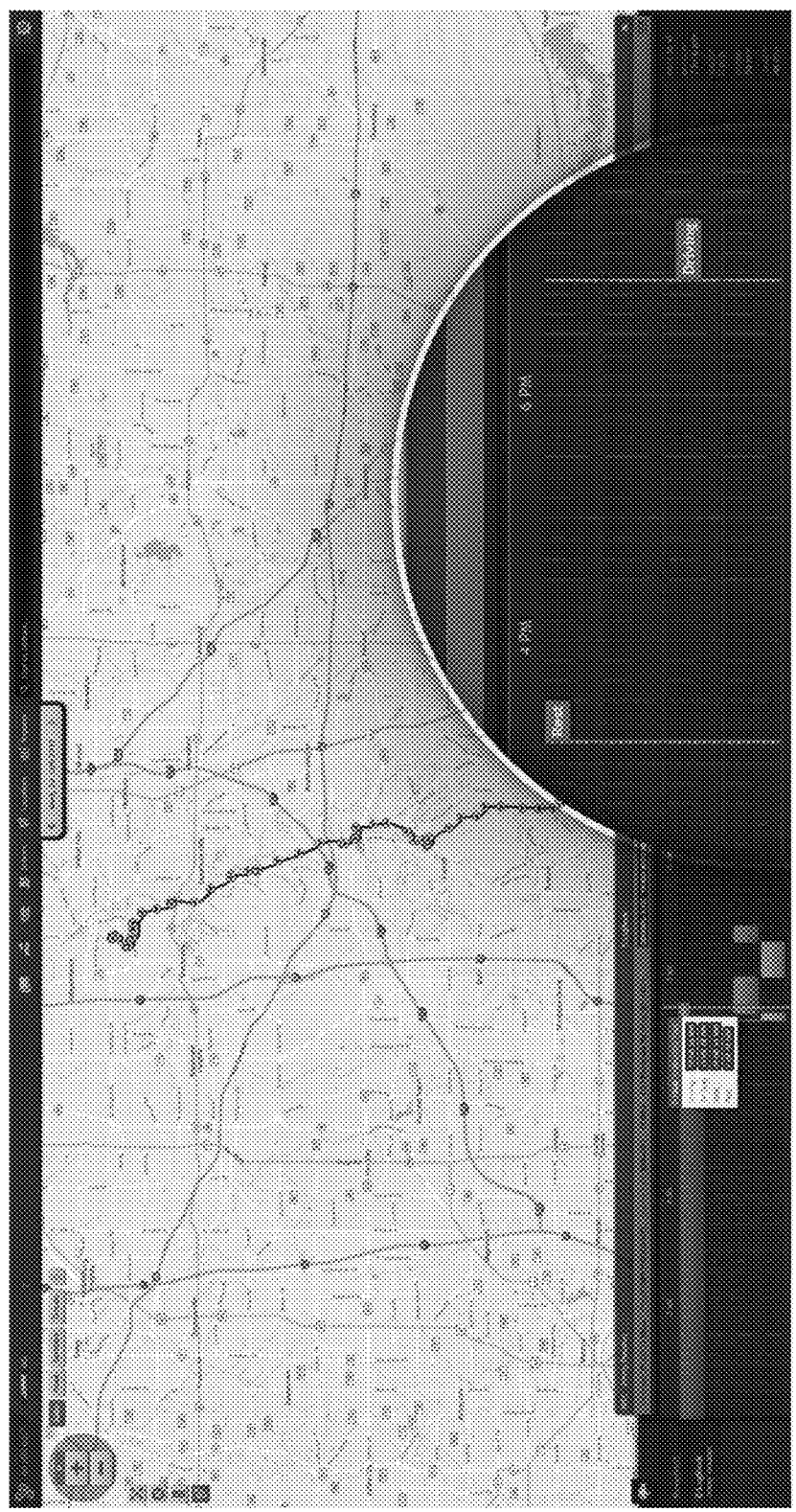
Figure 3D:

FIGS. 3B, 3C, and 3D depict various embodiments of an ELD user interface, which may be represented on a remote device 110, such as a vehicle based computer display, and/or on a Dispatcher computer and display at the carrier facility 170. In FIG. 3B, a person at Dispatch 130 may hover over a particular time to view remaining driving time and on duty time at any given point. The route and scheduled stops are also depicted on a map displayed on the user interface. FIG. 3C depicts two flags noted on a timeline of the day. The first red flag depicts the time by which the vehicle operator needs to take a rest break. The second red flag depicts the time by which the vehicle operator needs to cease driving altogether in order to stay in compliance with total driving time limits. FIG. 3D depicts an exemplary case where the vehicle operator is in violation of a rest break regulation.

FIG. 4 illustrates a table indicating the possible states of the binary values for the duty status variables. When a variable is set to a high value (1), the other variables are set low (0). FIG. 3A visually displays the effect in the UI of a duty status variable being set high and low for a predetermined period. As shown in both FIG. 3A and FIG. 4, when the "driving" mode is set high (1), the "on duty", "sleeper", and "off duty" modes are set low (0). In some embodiments, a "Driving" status variable is set high automatically when movement of the vehicle is detected, and an "On-duty" status variable is set high (1), and the "Driving" status variable is set low (0) when movement is interrupted. As shown in FIG. 4, a high (1) state in the any variable causes a low state (0) to be set in all remaining status variables.

Figure 5:
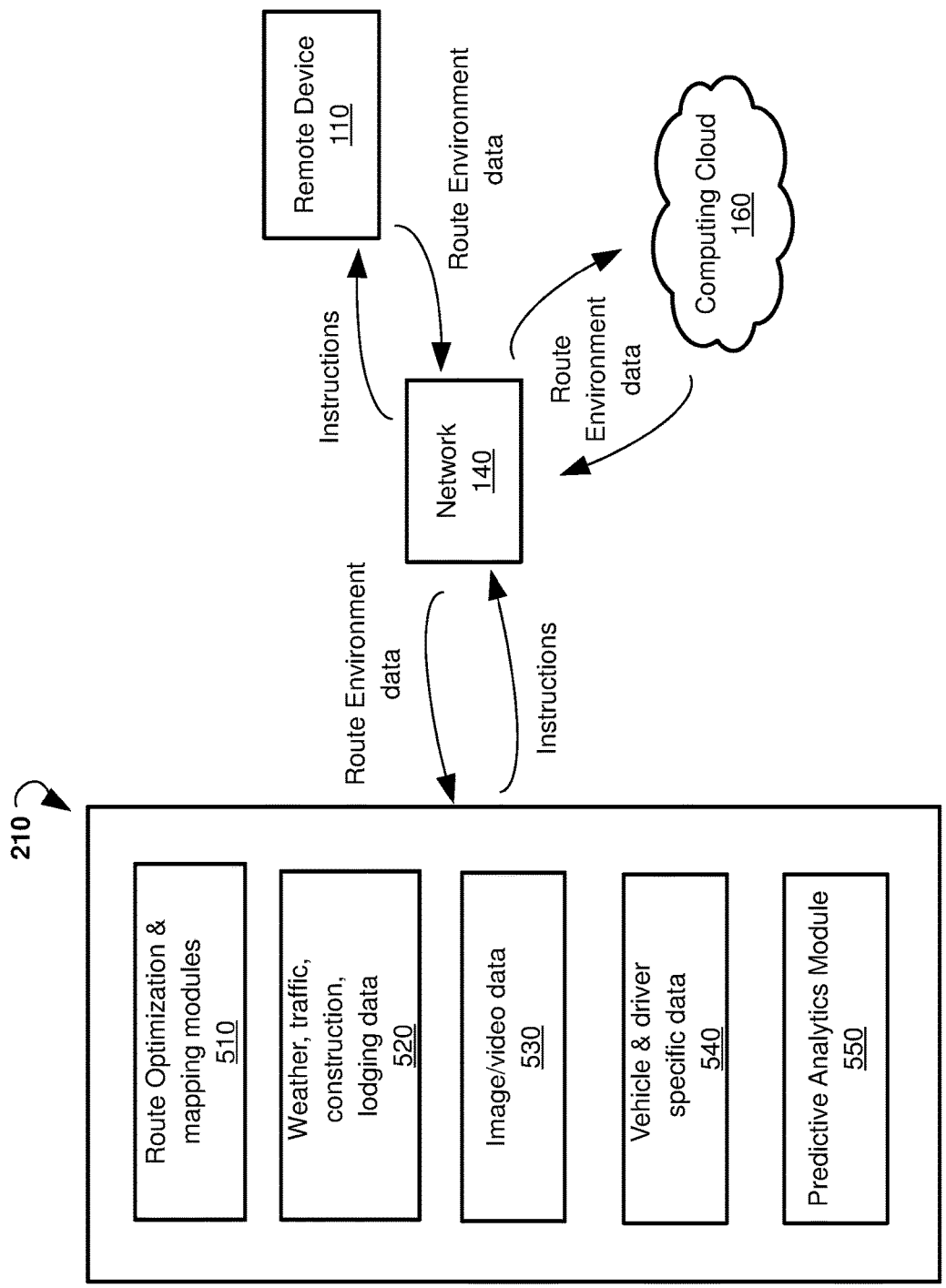
FIG. 5 is an illustration showing an exemplary computer and networking interface with modules to perform prediction analysis, according to an embodiment.

FIG. 5 illustrates an interactive embodiment of a compliance violation avoidance system using real-time route environment data with predictive analytics. A remote device 110, such as a computer and camera in a carrier vehicle transmits route environment data through a network 140 to the predictive analytics computer system 210 assigned to aggregate vehicle service data, predict impending noncompliance with regulations (e.g. State and Federal), and offer solutions to prevent or mitigate violations of noncompliance. In some embodiments, the computer may include modules for route optimization and mapping 510, modules to analyze recorded and contemporaneous weather, traffic, construction, and lodging data 520, modules for analysis of images taken en route, and modules for analyses of vehicle and driver specific data 540. The incoming route environment data may be stored in a database in memory for later analysis by a predictive analytics module 550. In various embodiments, analysis by the predictive analytics module 550 may detect an impending violation of a compliance regulation, and warn Dispatch 130 or the vehicle operator 120 of the impending violation. In some embodiments, Dispatch 130 or the vehicle operator 120 may determine an appropriate course of action to avoid or mitigate the impending violation. In other embodiments, the predictive analytics module 550 may determine an alternate course of action to avoid or mitigate the violation and offer Dispatch 130 or the vehicle operator 120 the one or more course(s) of action. Route environment data may be received from a remote device 110 and from computers on a network 140 or from other servers on a computing cloud 160. The performed predictions may be relayed back to a remote device 110 in a vehicle to alert the vehicle operator to perform actions that may prevent or mitigate the predicted violation.

Figure 6:
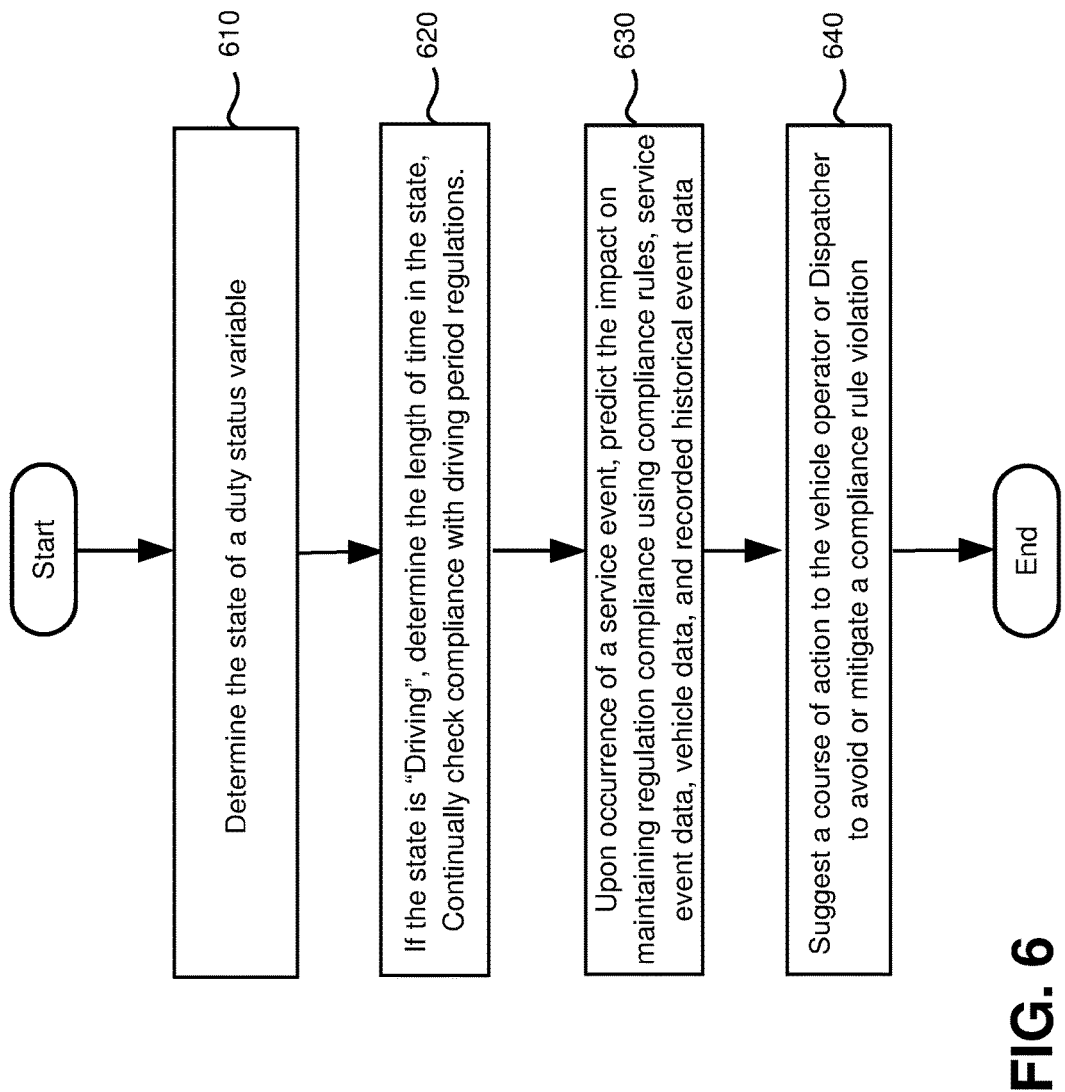
FIG. 6 is a block diagram of a method to perform prediction analysis, according to an exemplary embodiment.

FIG. 6 is a block diagram showing the steps followed for an exemplary embodiment of the predictive analytics module 550. Initially, the system may determine the state of a duty status variable such as the mode of vehicle operation 610. If the state is "Driving", for example, the period in that state is ascertained to determine noncompliance with a rule 620. If there is no imminent risk of a violation, the system may wait until the occurrence of a service event, such as a delay due to inclement weather, delays due to traffic, and the like, which triggers the predictive analytics module 550 to evaluate the concurrent data, as well as any relevant historical data to determine the risk of a compliance violation 630. If a risk is determined to be greater than a threshold value, the system may alert the vehicle operator 120 or a person at Dispatch 130 and suggest a course of action to avoid or mitigate the compliance rule violation 640. As an example, in response to slowed traffic (the service event) due to a collision on an interstate highway, the system may determine a high risk that the traffic will so impair an Estimated Time of Arrival (ETA) for the vehicle, that a driver might risk not meeting the ETA deadline by driving for a period longer than is regulated, and/or skipping required breaks. In anticipation, a predictive analytics module 550 may compute an alternate route for the vehicle operator 120 as to prevent a compliance violation. In some embodiments, the predictive analytics module 550 may compute an extra rest stop or may suggest a stay in a hotel or other lodging accommodations overnight to prevent a compliance violation. The predictive analytics module 550 may, for example, determine and suggest a number of hotels along the route, or alternatively, the predictive analytics module 550 may request hotel information from another server, including a cloud-based server.

In various embodiments, predictive analytics module 550 operates in conjunction with inputs from route optimization and mapping module 510, weather, traffic, construction, lodging data 520, image/video data 530, vehicle and driver specific data 540, and/or other inputs. Artificial intelligence, such as from a system of neural networks, is applied to the various inputs to enable the predictive analytics module 550 to predict a potential compliance violation and provide corrective recommendations accordingly. For example, route optimization and mapping module 510 may contain information regarding a number of stops, and an estimated length of time at each stop for a particular vehicle. If the weather, traffic, construction, lodging data 520 detects an unexpected weather or traffic delay, the predictive analytics module 550 can apply the artificial intelligence to update the route, number of stops on the route, and/or scheduled rest stops for the vehicle operator such that the operator can remain in compliance with regulatory limits, despite the unexpected delays. By continuously receiving input from any number of sources regarding traffic, and/or weather, the system can integrate that information with the remaining route information to predict a likelihood of the vehicle operator becoming noncompliant by exceeding drive time and/or on duty time. Additionally, historical data for each scheduled stop can be utilized, along with vehicle operator physical condition (such as drowsiness or distractedness), to predict a likelihood of noncompliance and recommend a corrective action, such as an additional rest break or overnight stay at a particular lodging place.

Figure 7:
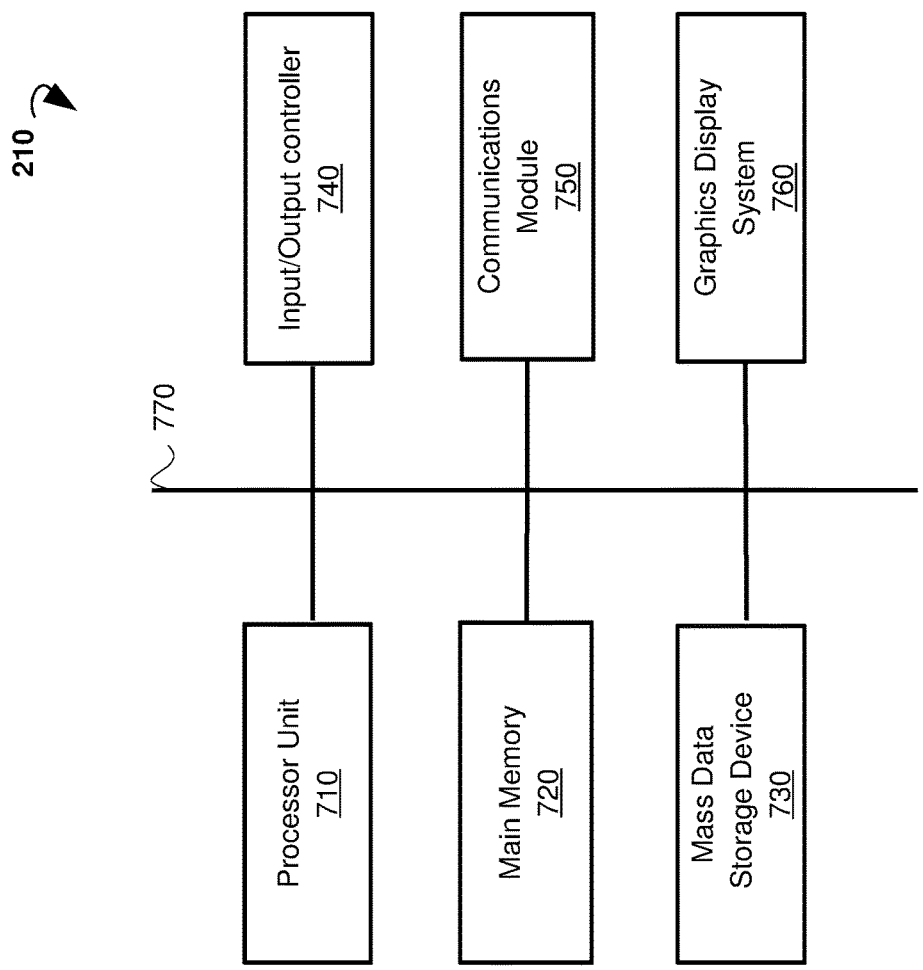
FIG. 7 is a block diagram illustrating the components of the computer for performance of the prediction analytics, according to an exemplary embodiment.

FIG. 7 illustrates an exemplary predictive analytics computer system 210 that may be used to implement elements of various embodiments of the present technology. The predictive analytics computer system 210 of FIG. 7 may be implemented in the context of computing systems, networks, servers, or combinations thereof. One or more processor units 710 may process firmware, and software that implement the predictive data analytics functionality. A main memory (e.g., non-transitory computer readable storage medium) 720 may store, at least in part, instructions and data for execution by one or more processor units 710. The predictive analytics computer system 210 may analyze carrier-specific, operator-specific, and route-specific data. In various embodiments, carrier-specific information may include company selected route preferences. For example, vehicles carrying hazardous materials, such as oil tankers, must travel on certain roads only. In other embodiments, armored vehicles, school buses, and other types of vehicle carrying specific types of cargo, may need to follow specific routes. Operator-specific data may include total driving time thus far, total on duty time, etc. The route-specific data may include weather, traffic, construction, and vehicle global positioning system (GPS) information. Other route-specific information includes rest area location and facilities offered, restaurant location, weigh station location, and hotel accommodation and pricing. For example, the predictive analytics computer system 210 may be configured to receive traffic images from a remote device 110, such as an in-vehicle imaging device and a computer may store the images, to be used to help identify locations on a particular route. Images and data may be stored in mass data storage device(s) 730 or sent through one or more data buses 770 and a communications module 750, to other computers and operators, such as to Dispatch 130. Image and text data may be presented on a computer display via the Graphics Display System 760. One or more processor units 710 and main memory 720 may be connected using a local microprocessor bus, and the mass data storage device(s) 730, and graphics display system 760 may be connected via one or more input/output (I/O) buses.

Mass data storage device(s) 730, which can be implemented with a magnetic disk drive, solid state drive, or an optical disk drive, is a non-volatile storage device for storing data and instructions for use by one or more processor units 710. A mass data storage device(s) 730 stores the system software for implementing embodiments of the present disclosure, and all or part of the software may be loaded into main memory 720 during program execution.

A remote device 110 located within a vehicle, interfaces with a vehicle operator 120 using a User Interface (UI) and User input devices. User input devices may include one or more touchscreen, microphone, an alphanumeric keypad, such as a keyboard, a pointing device, such as a mouse, a trackball, a trackpad, a stylus, or cursor direction keys, for entering and manipulating alphanumeric and other information. Data is presented on a remote device 110, to the vehicle operator 120, using output devices such as a speaker, printer, network interface, and graphics display system.

A graphics display system includes a liquid crystal (LCD) display, light emitting diode (LED) display, or other suitable display device. The graphics display system is configurable to receive textual and graphical information and processes the information for output to the display device.

In various embodiments, the interface between hardware, firmware, and software may be directed by one or a plurality of operating systems, including UNIX, LINUX, WINDOWS, MAC OS, ANDROID, IOS, CHROME, TIZEN, and other suitable operating systems.

Portions of the processing for various embodiments may be implemented in software code and data may be cloud-based on one or a plurality of servers. In some embodiments, the prediction analytics computer system 210 is implemented as a virtual machine operating within a computing cloud 160. In other embodiments, the prediction analytics computer system 210 may be assisted by cloud-based computers, where a plurality of software functions are executed by distributed computers.

In general, a cloud-based computing environment is a resource that typically combines the computational power of a large grouping of processors (such as within web servers) and/or that combines the storage capacity of a large grouping of computer memories or storage devices. Systems that provide cloud-based resources may be used exclusively by their owners or the systems may be accessible to other users who deploy applications within the computing infrastructure to obtain the benefit of large computational or storage resources.

The cloud may be formed, for example, by a network of web servers that comprise a plurality of computing devices, similar in configuration to the predictive analytics computer system 210, with each server, or at least a plurality thereof, providing processor and/or storage resources. These servers may manage workloads provided by multiple users (e.g., cloud resource customers or other users). Typically, each user places workload demands upon cloud resources that vary in real-time. The nature and extent of these variations may depend, for example, on the type of business served by the resources.

The present technology is described above with reference to example embodiments. The illustrative discussions above are not intended to be exhaustive or to limit embodiments of the disclosed subject matter to the forms disclosed. Modifications and variations are possible in view of the above teachings, to enable others skilled in the art to utilize those embodiments as may be suitable to a particular use.

What is claimed is:

1. A method for electronic logging of carrier data, the method comprising:
   monitoring a vehicle motion status for a predetermined time period and assigning a logical state to at least one duty status variable;
   monitoring at least one current vehicle service event capable of changing a transit time period;
   determining, based on processing the at least one current vehicle service event, a predicted likelihood that the transit time period will change;
   aggregating values for each of the at least one duty status variable over a specified quantity of the predetermined time period, the specified quantity being determined by a predetermined rule;
   predicting a likelihood of occurrence of a potential impending compliance rule violation based at least in part on:
      the aggregated values,
      the predicted likelihood that the transit time period will change, and
      a group of compliance rules;
   determining that the predicted likelihood of occurrence of the potential impending compliance rule violation is greater than a predetermined threshold value; and
   generating, if the predicted likelihood of occurrence of the potential impending compliance rule violation is greater than the predetermined threshold value, an indicator of the predicted likelihood of occurrence of the potential impending compliance rule violation, and presenting the indicator of the predicted likelihood of occurrence of the potential impending compliance rule violation to at least one electronic device to facilitate preventing the potential impending compliance rule violation.

2. The method of claim 1, wherein the at least one vehicle service event comprises a rerouting of a service path, an unscheduled vehicle operator change, an unscheduled delay in service, and an interruption of service.

3. The method of claim 1, wherein the predicted likelihood that the transit time period will change is based on a mean recorded transit time period for a plurality of previously recorded vehicle service events.

4. The method of claim 3, further comprising continually updating the recorded vehicle service events.

5. The method of claim 1, further comprising generating a suggested vehicular action, wherein performance of the suggested vehicular action is predicted to prevent the potential impending compliance rule violation.

6. The method of claim 5, wherein the suggested vehicular action comprises at least one of: alternating vehicle operators, rerouting a vehicular path, stopping the vehicle at a designated location, and altering speed, direction, or vector of the vehicle.

7. The method of claim 1, wherein the duty status variable comprises on-duty, off-duty, sleeper, and driving, each duty status variable exhibiting one of two binary states for a predetermined period.

8. A system for electronic logging of carrier data, the system comprising:
   a processor; and
   a memory communicatively coupled with the processor, the memory storing instructions, the instructions executable by the processor to:
      monitor a vehicle motion status for a predetermined time period and assign a logical state to at least one duty status variable;
      monitor at least one current vehicle service event capable of changing a transit time period;
      determine, based on processing the at least one current vehicle service event, a predicted likelihood that the transit time period will change;
      aggregate values for each of the at least one duty status variable over a specified quantity of the predetermined time period, the specified quantity being determined by a predetermined rule;
      predict a likelihood of occurrence of a potential impending compliance rule violation based at least in part on:
         the aggregated values,
         the predicted likelihood that the transit time period will change, and
         a group of compliance rules;
      determine that the predicted likelihood of occurrence of the potential impending compliance rule violation is greater than a predetermined threshold value; and
      generate, if the predicted likelihood of occurrence of the potential impending compliance rule violation is greater than the predetermined threshold value, an indicator of the predicted likelihood of occurrence of the potential impending compliance rule violation, and present the indicator of the predicted likelihood of occurrence of the potential impending compliance rule violation to at least one electronic device to facilitate preventing the potential impending compliance rule violation.

9. The system of claim 8, wherein the at least one vehicle service event comprises a rerouting of a service path, an unscheduled vehicle operator change, an unscheduled delay in service, and an interruption of service.

10. The system of claim 8, wherein the predicted likelihood that the transit time period will change is based on a mean recorded transit time period for a plurality of previously recorded vehicle service events.

11. The system of claim 10, further comprising a method of continually updating the recorded vehicle service events.

12. The system of claim 8, further comprising a method of generating a suggested vehicular action, wherein performance of the suggested vehicular action is predicted to prevent the potential impending compliance rule violation.

13. The system of claim 12, wherein the suggested vehicular action comprises at least one of: alternating vehicle operators, rerouting a vehicular path, stopping the vehicle at a designated location, and altering speed, direction, or vector of the vehicle.

14. The system of claim 8, wherein the duty status variable comprises on-duty, off-duty, sleeper, and driving, each duty status variable exhibiting one of two binary states for a predetermined time period.

15. A non-transitory computer-readable storage medium having embodied thereon instructions, which, when executed by at least one processor, perform steps of a method, the method comprising:

monitoring a vehicle motion status for a predetermined time period and assigning a logical state to at least one duty status variable;

monitoring at least one current vehicle service event capable of changing a transit time period;

determining, based on processing the at least one current vehicle service event, a predicted likelihood that the transit time period will change;

aggregating values for each of the at least one duty status variable over a specified quantity of the predetermined time period, the specified quantity being determined by a predetermined rule;

predicting a likelihood of occurrence of a potential impending compliance rule violation based at least in part on:
 the aggregated values,
 the predicted likelihood that the transit time period will change, and
 a group of compliance rules;

determining that the predicted likelihood of occurrence of the potential impending compliance rule violation is greater than a predetermined threshold value; and generating, if the predicted likelihood of occurrence of the potential impending compliance rule violation is greater than the predetermined threshold value, an indicator of the predicted likelihood of occurrence of the potential impending compliance rule violation, and presenting the indicator of the predicted likelihood of occurrence of the potential impending compliance rule violation to at least one electronic device to facilitate preventing the potential impending compliance rule violation.

16. The non-transitory computer-readable storage medium of claim 15, wherein the at least one vehicle service event comprises a rerouting of a service path, an unscheduled vehicle operator change, an unscheduled delay in service, and an interruption of service.

17. The non-transitory computer-readable storage medium of claim 15, wherein the predicted likelihood that the transit time period will change is based on a mean recorded transit time period for a plurality of previously recorded vehicle service events.

18. The non-transitory computer-readable storage medium of claim 17, further comprising a method of continually updating the recorded vehicle service events.

19. The non-transitory computer-readable storage medium of claim 15, further comprising a method of generating a suggested vehicular action, wherein performance of the suggested vehicular action is predicted to prevent the potential impending compliance rule violation.

20. The non-transitory computer-readable storage medium of claim 19, wherein the suggested vehicular action comprises alternating vehicle operators, rerouting a vehicular path, stopping the vehicle at a designated location, and altering speed, direction, or vector of the vehicle.

21. The non-transitory computer-readable storage medium of claim 15, wherein the duty status variable comprises on-duty, off-duty, sleeper, and driving, each duty status variable exhibiting one of two binary states for a predetermined period.

* * * * *